March 7, 1939. W. W. SAYERS ET AL 2,149,313
TANK
Filed Aug. 22, 1935 6 Sheets-Sheet 1
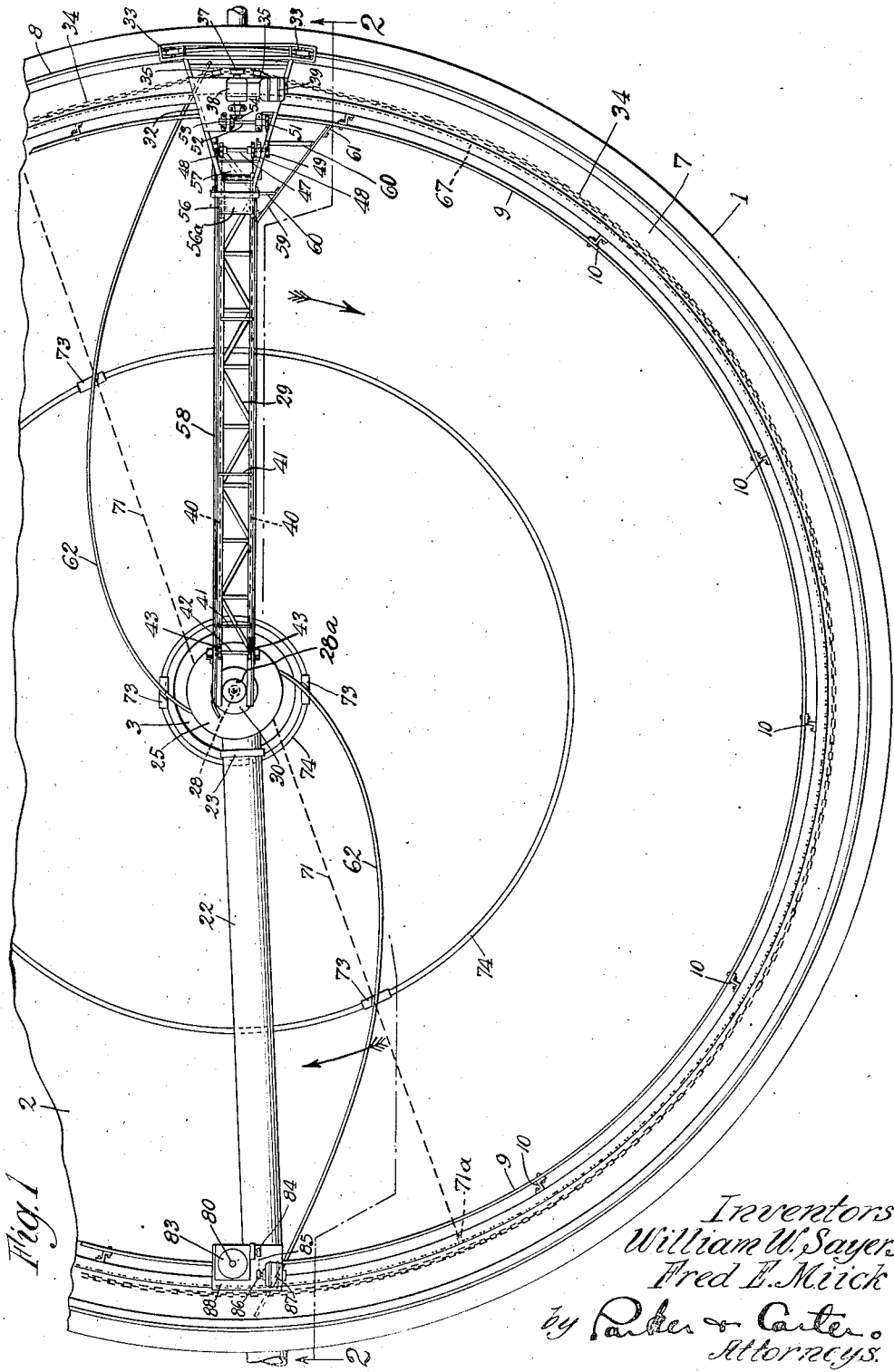

March 7, 1939.  W. W. SAYERS ET AL  2,149,313
TANK
Filed Aug. 22, 1935  6 Sheets-Sheet 2
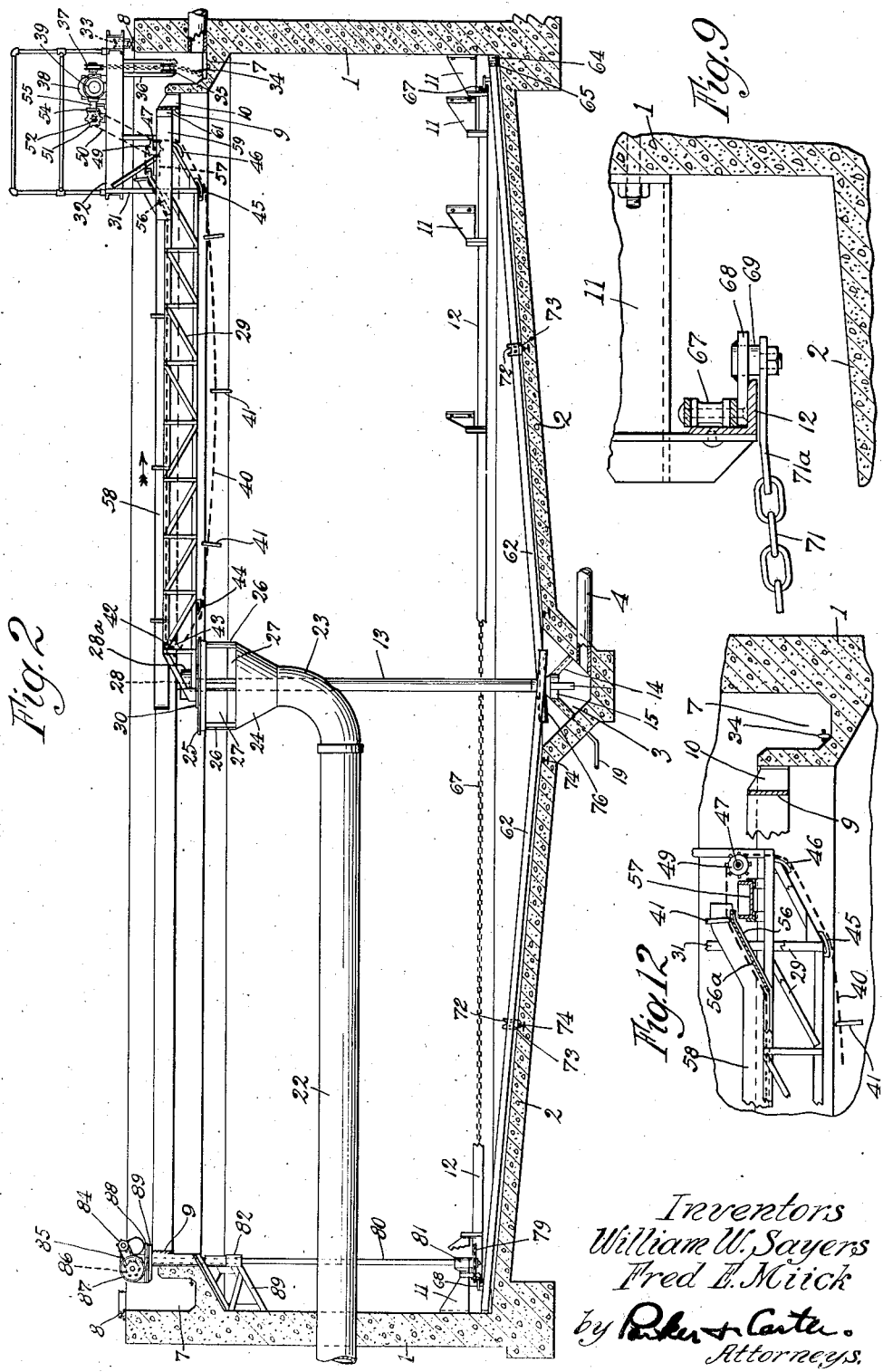

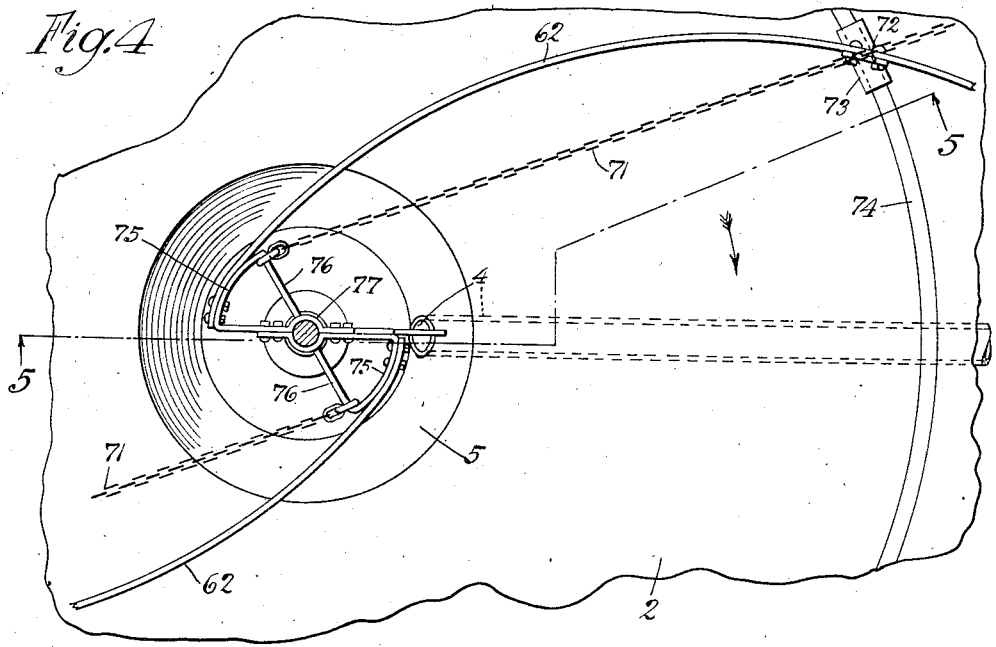
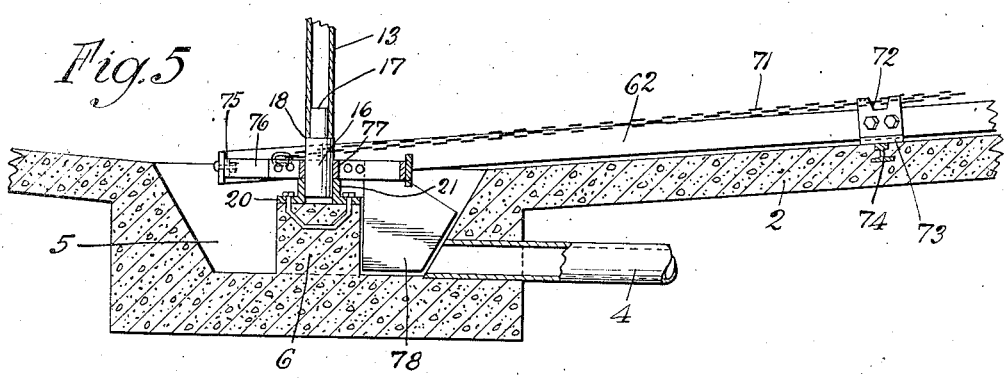
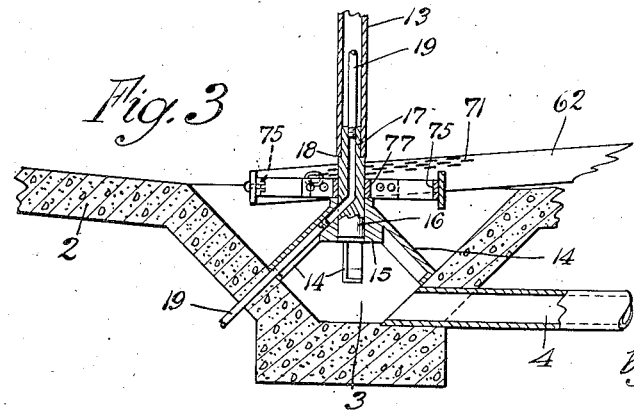

March 7, 1939.  W. W. SAYERS ET AL  2,149,313
TANK
Filed Aug. 22, 1935   6 Sheets-Sheet 4
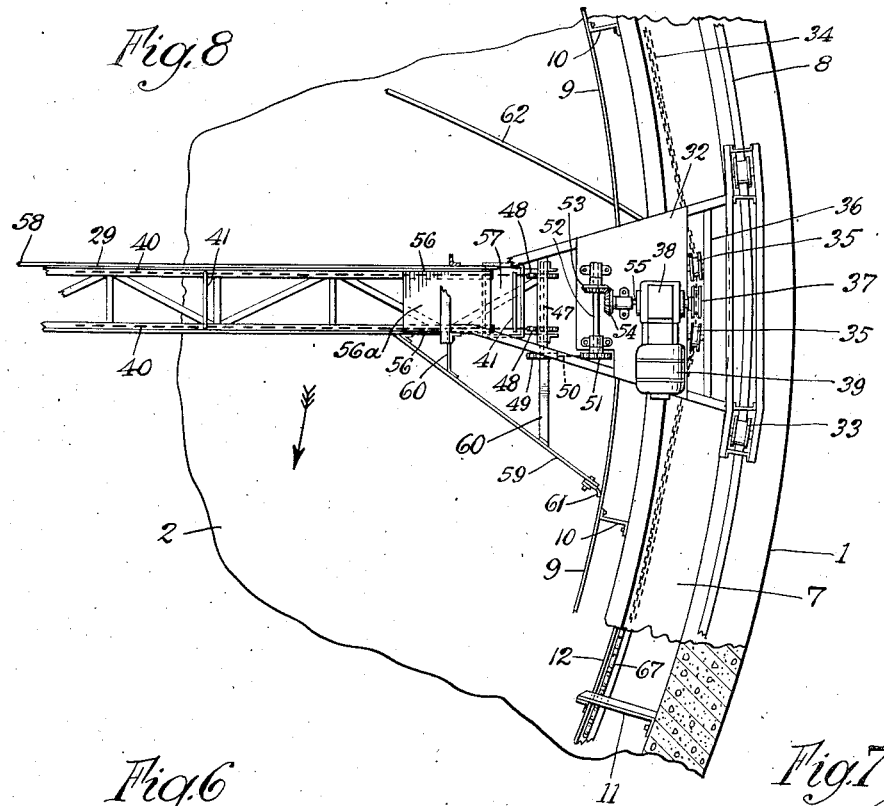
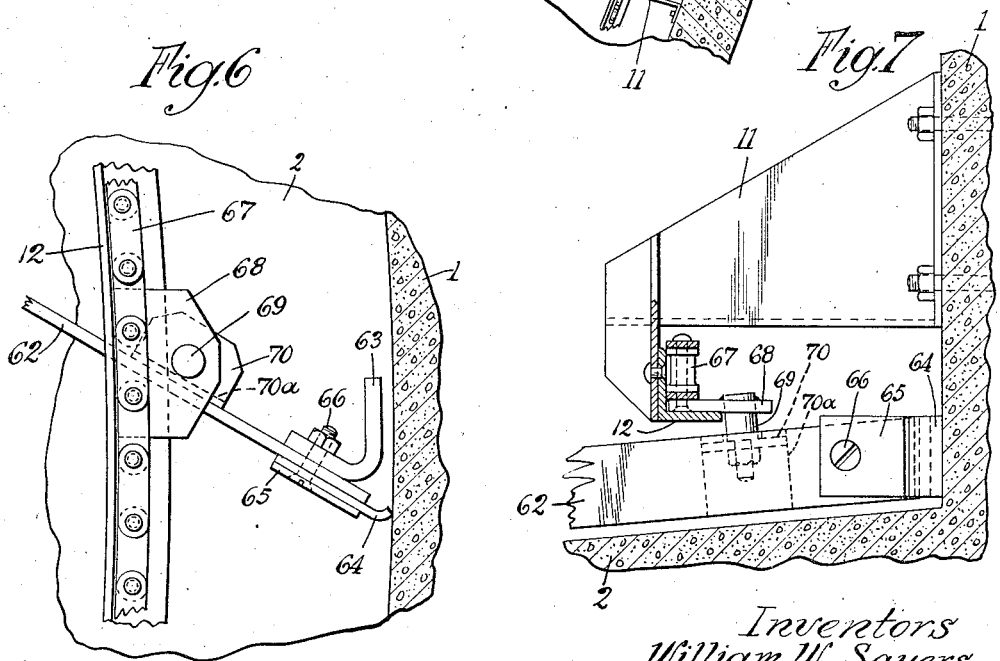
Inventors
William W. Sayers
Fred E. Miick
by Parker & Carter
Attorneys.

Inventors
William W. Sayers
Fred E. Miick
by Parker + Carter
Attorneys.

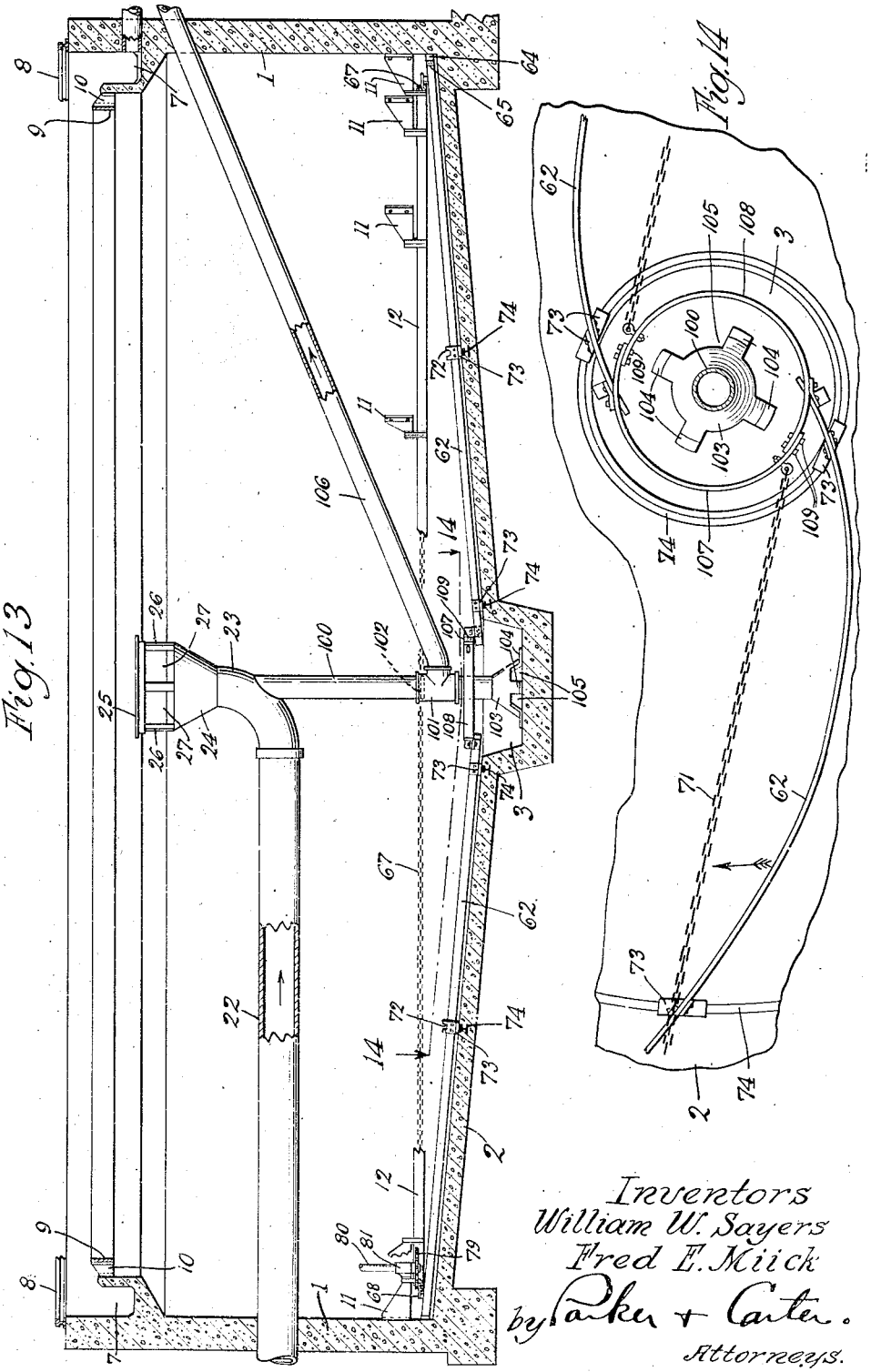

Patented Mar. 7, 1939

2,149,313

UNITED STATES PATENT OFFICE 2,149,313

TANK

William W. Sayers, Chicago, Ill., and Fred E. Miick, Los Angeles, Calif., assignors to Link-Belt Company, Chicago, Ill., a corporation of Illinois Application August 22, 1935, Serial No. 37,308

15 Claims. (Cl. 210—55)

This invention relates to a tank and to a mechanism associated with it for collecting relatively solid material which has separated out or been separated from the liquid.

In the form illustrated the invention is primarily adapted for use with sedimentation tanks for the treatment of sewage, but it is not limited to sewage treatment and is applicable generally to tanks with which it is desirable to provide means for cleaning the bottom of the tank or for removing material floating at the surface of the liquid, or both.

It has one object to provide means for collecting material both on the bottom of the tank and on the surface of liquid within the tank. Another object is to provide means for independently sweeping the bottom of the tank, removing scum from the surface of the liquid and for introducing liquid at a point above the bottom of the tank and below the surface of the liquid within the tank.

Another object is to provide such upper and lower collecting means that a fixed influent connection may be arranged between the two collecting means without interfering with either of them.

Other objects will appear from time to time in the specification and claims.

The invention is illustrated more or less diagrammatically in the accompanying drawings, wherein:—

Figure 1 is a plan view;

Figure 2 is a transverse, generally vertical section taken at line 2—2 of Figure 1;

Figure 3 is a generally vertical sectional detail showing the center support of Figure 2;

Figure 4 is a plan view illustrating in detail the bottom hopper in modified form;

Figure 5 is a generally vertical section taken at line 5—5 of Figure 4, illustrating the modified form of hopper;

Figure 6 is a detail in plan of the track and the outer end of the scraper;

Figure 7 is a generally vertical sectional detail showing the connection of the chain with the outer end of the bottom scraper, as well as associated parts;

Figure 8 is an enlarged partial plan view of the conveyor assembly which is shown generally in Figure 1;

Figure 9 is a generally vertical sectional detail taken on an enlarged scale and showing the manner of attachment of one of the tie chains to the driving chain;

Figure 12 is a detail view on an enlarged scale, showing the scum box and associated mechanism;

Figure 13 is a vertical transverse section generally similar to Figure 2, showing a modified form of influent inlet; and Figure 14 is a transverse vertical section taken on an enlarged scale at line 14—14 of Figure 13.

Like parts are designated by like characters throughout the specification and drawings.

Figure 11:
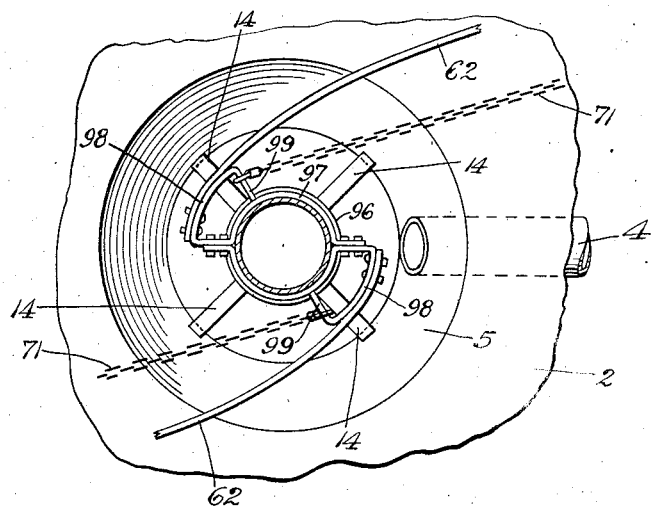
Figure 11 is a horizontal sectional detail on an enlarged scale, taken at line 11—11 of Figure 10.

In the form here shown the invention is applied to a circular tank but is not limited to a tank of that or any other particular shape. As shown the tank comprises a side wall 1 and a bottom or floor 2, which preferably slopes inwardly toward the center, as indicated particularly in Figure 2. A sludge hopper 3 is preferably formed in the bottom of the tank and is provided with a sludge draw-off conduit or connection 4 through which sludge is withdrawn from the hopper.

In the form of the invention illustrated in Figures 4 and 5, a modified form of sludge hopper is provided. As shown in those figures there is an annular hopper 5 in the center of which is positioned a raised member 6. About the top of the wall of the tank is formed an effluent trough 7 and on the top of the side wall 1 is mounted a track 8 which is concentric with the tank and carries a portion of the scum collecting and conveying mechanism which will be described in detail below. Fixed upon the inner face of the tank wall and projecting inwardly from the scum trough and at a height approximately at water level is a scum baffle 9 which, in the form shown, comprises a metallic plate which extends above and below the water line and is supported from the tank wall by supports 10. Projecting inwardly from the side wall 1 of the tank and positioned adjacent the bottom of the tank is a plurality of supporting brackets 11 which support, in the form here shown, an annular track 12 made preferably of angular shape, as shown generally in Figure 2 and in detail in Figures 6 and 7. The member 12 serves as a track for the sludge scraping mechanism and for the driving means for that mechanism.

In the various forms of the device there is provided a central supporting member extending upwardly from the center of the tank and serving as a support for an influent conduit and also as a support for a portion of the movably mounted conveying mechanism. In the form of the device shown in Figures 1, 2 and 3, since the tank in its bottom is provided with a single sludge hopper 3, the support 13 is carried upon a tripod or other open supporting member 14 positioned preferably partially within the hopper. The tripod 14 supports a center position 15 to which an upwardly extending pivot shaft 16 is secured. This shaft is reduced as at 17 and provides a shoulder 18. The support 13 thus rests upon the shaft 17 and against the shoulder 18. It may or may not be hollow. If hollow it may serve to enclose a conduit 19 by means of which electrical current is transmitted upward toward the movable scum conveying mechanism when provided.

In the form of the device shown in Figures 4 and 5, in which there is an annular hopper 5 instead of the single hopper 3 of the earlier figures, a plate 20 is secured to the top of the member 6 and the pivot shaft 16 is mounted in a hollow extension 21 from the plate 20 and in this form the pipe or support 13 rests upon the shoulder 18 and about the reduced portion 17 as described above. Although it is not shown in this form of the device, an electrical conduit may extend upwardly through the pipe 13.

22 is an influent pipe or conduit extending through the side wall 1 of the tank above the bottom of the tank and below the water surface. An elbow 23 may be provided and this is supported by the support 13 as shown in Figure 2. The elbow 23 joins an outwardly flared portion 24, which carries a baffle 25, which although it may be perforated or provided with other openings, is ordinarily solid and is carried from the member 24 by supports 26 leaving open ports 27 through which the influent is discharged into the tank. The support 13 may extend upwardly through the elbow 23 and outwardly through the top of the member 25 to provide a pivot support 28 for the moving bridge or conveyor assembly which will be described below. 28a is a current collector.

The upper moving conveyor which for purposes of convenience will be called a scum conveyor, although it is not limited in its use to conveying scum, is arranged primarily to collect and remove material which is at or near the upper surface of the liquid within the tank. Ordinarily this will be scum floating upon the surface of the liquid. The scum conveyor comprises a bridge structure 29 which at one end carries a bearing plate 30 and centered upon the pivot 28. Any suitable antifriction means may be provided if desired. Preferably the major portiton of the conveyor bridge lies normally below the surface of liquid within the tank. At its outer end the bridge 29 joins a raised bridge structure 32 which is located above the liquid surface and is supported upon flanged rollers 33 on the track 8 for movement around the tank.

This bridge or conveyor assembly is provided with means for moving or driving it about the tank, whatever the shape of the tank, and in the form here shown it pivots about the central pivot 28 and revolves about the tank center. As one means for driving it an endless chain 34 is provided and is mounted within the scum trough 7. This chain passes upwardly about one or more wheels 35, carried at the lower end of a support 36 which extends downwardly from the bridge portion 32 and is engaged by a pocketed wheel 37 driven through a reducing gear 38 by a motor 39. When the motor is rotated and the gearing driven the pocketed wheel 37, meshing with the chain 34, pulls the assembly around the tank by means of the chain 34. Ordinarily the draw of the chain, or its frictional engagement with the trough or trough walls anchors it sufficiently and for most purposes, therefore, the chain merely lies in the scum trough and the conveyor assembly is effectively pulled around the tank by the chain which is lifted out of the trough as it passes around drive sheaves on the bridge section 32 and is then lowered into the trough again.

As shown, conveying means are provided on the conveyor bridge for moving scum and other material floating upon or near the surface of the liquid within the tank from the center to the edge of the tank for deposit in a scum receiving receptacle which may be of any desired construction. This conveyor, in the form shown, comprises a pair of endless chains 40 to which flights 41 are attached. Adjacent its inner end the bridge 29 carries a shaft 42 upon which sprockets 43 are positioned. The chains run about these sprockets. A guide 44 may be provided toward the bottom of the bridge 29 adjacent its inner end. Adjacent its outer end a similar guide 45 is provided and a second guide 46. There will, of course, be pairs of the guides 45 or 46, or sprockets or other rotary elements may be substituted. A shaft 47 is positioned above the surface of the liquid and carries a pair of driving sprockets 48 which are engaged by the chains 40 and which drive them. At its outer end the shaft 47 carries a sprocket 49 which by means of a chain 50 is driven from the sprocket 51 on a shaft 52, which also carries a beveled gear 53 which meshes with a second beveled gear 54 upon the shaft 55 driven by the reduction gear 38. Additional chain guiding means 56 may be provided adjacent the outer end of the bridge to cause the flights at that end to move upwardly from the level of the upper run of the chains so as to clear a scum collecting pan 57 which is itself removably positioned within the portion of the bridge structure which lies above the liquid level. 56a is an inclined plate extending upwardly toward, and preferably over one edge of the scum box or pan. Along this plate the flights of the conveyor move the scum to drop it into the scum box.

A scum plow 58, extending above and below the liquid surface, is positioned preferably in general alignment with the bridge structure 29 and extends from its inner end to a point at or near its outer end. A deflector 59 is carried from the bridge structure 29 and may have additional supports or braces 60 and is provided in its outer end with a wiper 61 which is preferably made of rubber and wipes the scum baffle 9. This deflector collects the scum floating on the liquid surface between the scum baffle 9 and the outer end of the plow at one side of the conveyor flights and the conveyor flights convey the scum thus collected and discharge it finally into a scum trough or other receptacle by means of which scum is retained for removal from the tank.

As above pointed out, the bridge and scum conveyor assembly is driven around the tank so that it revolves about it and sweeps the upper surface bounded by the scum baffle 9. Ordinarily the bridge assembly rotates in the direction shown by the right hand arrow in Figure 1.

In addition to the scum conveyor, means may be provided for sweeping or scraping the bottom of the tank to move solids at or near the floor of the tank into the discharge hopper. This means comprises one or more sludge scrapers or collector blades 62. At their outer ends they approach closely to the inner surface of the tank wall 1. They carry preferably guards 63 which have a curved portion generally concentric with the tank wall and the blades 62 also carry wipers 64 which may be of rubber or other flexible material held in place on the outer end of the blade by a plate 65 and a bolt 66 which also serves to fasten the guard to the scraper blade. The wipers clean the floor and wall adjacent the outer end of the scraper.

The blades 62 are caused to rotate about the tank to scrape or sweep the floor by means of an endless chain 67 which is positioned within and supported and guided by the track 12. The chain has fastened to it laterally projecting plates 68, one for each scraper 62. The plates have secured to them, by welding or otherwise, downwardly projecting pins 69 which carry laterally extending, attachment members 70, formed on plates 70a, one of which is secured to each of the scrapers adjacent its outer end. By this means each scraper adjacent its outer end is secured to the endless chain 67. One or more tie chains 71 may or may not be provided and secured to the conveyor chain by similar projecting plates 68 and pins 69. Each chain 71 may be secured to an angle or attachment plate 71a as shown in detail in Figure 9. The plate 71a is in turn attached to the pin 69. The plates 71a are preferably positioned to be in close proximity to the under side of the track 12 and thus to serve as guides and aligning means for the endless chain 67 and thus to prevent its being tilted or twisted or otherwise brought into misalignment by the pull of the chains 71. As shown in Figure 4 the tie chains may cross over the blade 62 and when they do each chain rests in a notch or recess 72 formed in a wear plate 73. As shown there are two such chains 71. For some purposes the chains are not necessary and the parts will maintain themselves in alignment without chains or other aligning means. It may also be desirable where chains are used to use more than the number shown in the drawings. One such wear plate 73 may be positioned on each of the scrapers intermediate its ends and bears upon a track 74 fixed in the bottom of the tank. In the present case the tracks are shaped concentrically with the tank. Additional wear plates 73, but without the notch or recess 72, may be positioned on each of the scrapers adjacent its ends or elsewhere, and if this is done additional tracks 74 will be provided in the bottom of the tank.

At their inner ends the scrapers may be secured to the members 75 which are provided with generally radial portions 76 terminating in a hub 77 which centers and rests upon the upper surface of the member 15.

In the form shown in Figures 4 and 5 a wiping or scraping element 78 projects downwardly into the sludge hopper 5 and since its outline corresponds approximately with the cross section of the trough, movement of the member 78 about the trough moves the sludge or other deposit within the trough to the outlet pipe 4 and thus as the scrapers 62 rotate about the tank to scrape its bottom, the wiper 78 rotates about the sludge hopper to scrape it.

Ordinarily the direction of travel or rotation of the sludge scrapers which scrape or sweep the bottom of the tank is in the direction of the solid arrow shown in Figures 1 and 4. Their movement is accomplished by driving the endless chain 67. The driving mechanism comprises a sprocket 79 which engages the chain and is carried at the lower end of the drive shaft 80 which is itself at its lower end supported in a suitable bearing 81. 82 is a second bearing for the shaft 80 positioned at a point toward its upper end. The shaft 80 extends upwardly into a reduction gearing assembly 83, which is driven by a sprocket 84 which is itself driven by a chain 85 from a sprocket 86 on the shaft of a motor 87. This driving assembly is mounted on a platform 88 positioned generally near the top of the tank and may be carried by a supporting structure 89. The dimension and position of the driving assembly are such that the bridge of the scum conveyor assembly in its travel around the tank passes over and clears it.

Figure 10:
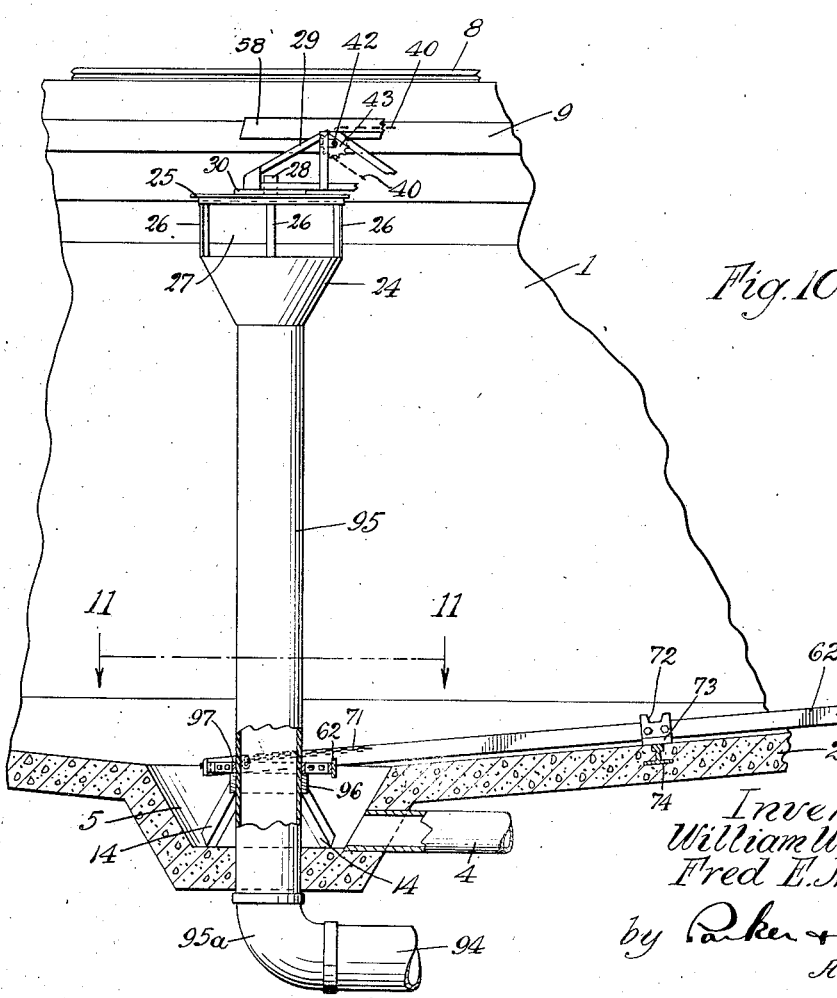
Figure 10 is a transverse vertical sectional detail on an enlarged scale, showing a further modification in which the influent connection extends upwardly to support the bridge assembly.

The modified form shown in Figures 10 and 11 embodies a hollow central column or influent connection or funnel and differs from the other forms shown primarily in the fact that the influent conduit, instead of passing through the side wall of the tank, passes through the bottom of the tank, through the sludge hopper 5 of the tank and extends upwardly to a point near the surface of the liquid. The construction of the top or discharge end of the influent conduit may be the same as that above described in connection with Figures 1 and 2 and the same bridge assembly and its details, although not illustrated fully in Figure 10, may be the same as those illustrated in the earlier figures and as described above. The means for scraping the bottom of the tank is generally the same as that shown in and described in connection with the other figures. It is modified only in so far as is necessary because the upwardly extending influent conduit is of greater diameter than the pipe or support 13, for example, of Figure 2.

In the form shown in Figures 10 and 11, 94 is an influent conduit, which by means of an elbow 95a connects with an upwardly extending central conduit member 95 which terminates in the outwardly flaring funnel member 24. This, and the parts above it, are the same as those described in connection with Figure 1 and this description need not be repeated.

Positioned within the hopper 5 are supports 14, as shown in Figure 2, and these to some extent support and steady the conduit member 95 and serve also to support a collar 96 upon which a two-part collar or hub 97 is positioned and about which it may rotate. This collar or hub 97 is generally similar in its purpose and operation to the hub 77 shown in detail in the earlier figures, particularly in Figure 3. Diametrically opposed lateral extensions 98 are attached to or formed integrally with the hub 97. They are preferably provided on their outer surfaces with arcuate faces concentric with the hub and to these are attached the scrapers 62 in the manner above described in detail in the earlier figures. Tie chains 71 are fastened to the lateral extensions 98, either to their arcuate portions or to other parts of them, for example, the generally radial spokes, 99. The construction just described provides a movable support for the inner ends of the scraping blades 62 and the tie chains 71 and this assembly rotates upon the collar 96 about the influent conduit 95.

In the modified form of Figures 13 and 14 the scum collecting and conveying means has been omitted for the sake of clearness and portions of the sludge removing and tank bottom sweeping mechanism has also been omitted for the same reason. In general the modified form of these figures differs from that shown in the earlier figures in two respects. First, in that it shows means for removing the sludge or other material which has accumulated in the bottom of the tank through the side wall of the tank, that is to say, at a point below the surface of the liquid and above the floor of the tank, and, second, in a modification in the means for attaching the inner ends of the scraper blades 62 in which they are not positively centered or guided but contact with a pivot or other centering member.

The inner end of the influent conduit is supported upon a column or member 100, which is joined to a T 101. This T forms in effect a part of the column. A plate or other closing member 102 is provided to close the open end of the T. At its lower end the column 100 is provided with a flared, inverted, funnel-like member 103 which terminates in feet 104 resting upon the foundation of the floor of the sludge hopper 3. Gates or openings 105 are provided between the feet 104.

Running diagonally upward and outward from the T 101 is a sludge conduit 106 which passes through the side wall of the tank above the bottom or floor of the tank and below the surface of the liquid within the tank. Sludge or other material which has accumulated in the hopper 103 is drawn off through the conduit 106 by a pump or other suitable means.

In Figure 14 there is shown particularly a means for securing and positioning the inner ends of the scraper blades 62 which differs from the form shown in Figures 3, 4 and 5, as well as from that shown in Figures 10 and 11 by reason of the fact that the scraper blades at their inner ends are not in contact with or centered or guided by the column. As shown in Figure 14 a two-part or split ring 107, 108, fastened together at 109, is provided which is positioned about the column 100 but does not contact it. The inner ends of the scraper blades 62 are fastened to this ring. Additional contact shoes 73 are fastened to the blades adjacent their inner ends and these rest upon a track 74 fixed in the tank floor. The centering chains 71 are secured at their inner ends to the ring 107, 108.

An important advantage of the construction shown in Figures 13 and 14 is that the sludge pipe, being above the floor of the tank, is readily accessible. A further advantage of the construction is that the split ring 107, 108 permits removal of the ring and associated parts without disturbing the sludge or influent pipe, since it does not pivot upon them and is not in contact with them.

It will be realized that whereas we have herewith shown and described a practical operative device, nevertheless many changes might be made in the size, shape, number and disposition of parts without departing from the spirit of the invention and we wish, therefore, that our showing be taken as in a sense diagrammatic.

Among the changes which might be made are, as above emphasized, the omission of one or the other of the conveying mechanisms. Thus the skimmer might be omitted or the sludge collector might be omitted. Where a skimmer is used it might be so arranged that one or the other run of the chain carrying the flights is above or below the surface of the liquid within the tank. For many purposes, as above pointed out, it is advantageous to have the chain on both upper and lower runs below the surface of the liquid, but this is not an essential arrangement. The skimmer might be arranged to skim on the upper run, in which case both runs will be substantially submerged or it might be arranged to skim on the lower run, in which case the upper run would be above the surface of the liquid and the lower run would be slightly above the surface of the liquid. Thus a variety of different positions may be given to the skimmer and to the skimmer chains, which, so long as the flights of the skimmer are in proper position to skim the surface of the liquid, would be within the contemplation of the present invention.

The use and operation of the invention are as follows:

While there has been shown herewith an installation having both a scum conveyor and a sludge removing means, many installations will have one or the other, but will not have both. For instance, ordinarily a scum conveyor is needed only in the primary tanks, where the apparatus is used for sewage treatment, since in secondary tanks no scum ordinarily accumulates and therefore in the secondary tank the scum conveyor could normally be omitted and the sludge conveyor or bottom cleaning mechanism is all that would be required for second and final sewage treatment tanks. It is true also that in certain uses the scum conveyor may be installed and used without any bottom cleaning mechanism.

In the operation of the device shown, for example, in Figure 1, which is adapted for the primary tanks of a sewage treatment plant, both the bottom cleaning and the surface skimming mechanisms would be used and the two operations may or may not take place simultaneously. However, in primary sewage treatment tanks it is desirable to skim the surface of the liquid frequently to remove the scum and in general to remove objectionable and unsightly floating matter. Ordinarily it is not necessary to clean the bottom of such a primary sewage treatment tank oftener than once or twice a day and, therefore, the two conveying mechanisms are arranged to operate independently of each other and may be operated separately, so that the bottom cleaning or sludge conveyor is operated occasionally during the day, normally once or twice, while the scum conveyor may be operated much more frequently. An added advantage in providing independent operating means arises from the fact that while it may frequently take an hour or more to clean the bottom of the tank it ordinarily requires only a few minutes to remove scum from the surface of the liquid.

Whether or not the present invention is embodied in a primary, secondary or final sewage treatment tank, the arrangement of the two material removing means and the arrangement of the drives for them is such that they may be operated independently and the tank bottom can be cleaned without any regard to the position or movement of the skimming apparatus, and the skimming apparatus may be used to remove scum from the surface of the liquid without any regard to the position or movement of the bottom cleaning mechanism. Thus complete independent means and operation are provided for cleaning the surface of the liquid and for cleaning the bottom of the tank, and since this is the case, since the two cleaning and conveying means are independent of each other and can be operated wholly independently, either may be installed in a tank without the other and without the necessity of any change in design. If the scum conveyor alone is to be installed, that may be done and it may take the form shown in Figures 1 and 2, without any change, and if the sludge conveyor or bottom cleaner is to be installed alone, that may be done and it may take the form shown in the figures, without any redesign or reconstruction.

It will be noticed that in the several forms of the invention practically all of the scum cleaning mechanism is located below the surface of the liquid. The flights attached to the chains of the scum conveyor extend above and below the surface of the liquid, and co-operate with the deflector which is adjacent one side of the flights, and with the scraper carried by the bridge assembly, in collecting and discharging scum which may be discharged from the assembly in any desired manner. As shown herewith it is deposited in a removable scum box or pan but other forms of scum boxes and other forms of removal of the collected scum may be used. By reason of the location of the major part of the scum collecting mechanism below the surface of the liquid in the tank, accumulation of ice and other unsightly solids on the conveying structure is reduced to a minimum.

As above pointed out, the surface collector and the bottom cleaner may be operated independently when both are installed in a single tank. The design of the two conveyors is such that the influent may be introduced through the side wall of the tank below the scum removing apparatus and below the surface of the liquid within the tank at any desired height. The sludge may be removed, as in the form shown in Figure 13, through the wall of the tank, that is to say, above the bottom of the tank and below the surface of the liquid and between the two conveyors. This arrangement of effluent introduction and sludge withdrawal is desirable and is made possible by the use of the totally indepenednt liquid surface and bottom cleaners.

In the several forms of the device in which the influent is shown entering through a conduit which passes through the wall of the tank, means have been provided for supporting that conduit from below, for example, by the member 13 at the center of the tank. Other means might be provided and the influent conduit might be supported from above, for example by a suspension structure from the tank wall or elsewhere.

In all of the forms of the invention except that shown in Figures 10, 11, 13 and 14, the influent is introduced to the tank at a point above the bottom of the tank and below the normal surface of liquid within the tank. That is to say, the influent conduit comes in through the side of the tank and discharges fluid into the tank above its bottom. In the form shown in Figures 10 and 11, the influent comes in from the bottom and the influent conduit extends upwardly from a point at the center of the bottom of the tank.

In the form shown in Figures 13 and 14 the influent comes in through the side of the tank and the sludge or other material collected at the bottom of the tank, instead of being discharged from or through the bottom is carried upwardly through the inclined conduit which passes outwardly through the tank wall and thus both the influent conduit and the sludge or discharge conduit pass through the tank wall and, therefore, between the bottom cleaning assembly and the scum removing assembly at the surface of the liquid.

In all forms of the invention means are provided for sweeping the bottom of the tank and for conveying material settled upon it toward the center, where a sludge hopper is located from which sludge is withdrawn. While the bottom of the tank is shown as inclined towards its center, this is not essential.

In the various forms of the invention the conveying means for moving material across the bottom and toward the sludge discharge hopper comprises one or more curved flights. These flights are curved with respect to their direction of movement so that as they move about the tank the material which they contact is urged from the periphery toward the center and finally discharged into the sludge hopper. These flights may be attached at their inner ends to some form of hub rotating about a central pivot, which may be coincident with a support 13, as shown in Figures 1 and 2 particularly, or a central influent conduit 95 as shown in Figures 10 and 11.

Whatever the particular arrangement of the mechanism at the center of the tank, some means is provided for centering the hub to which the flights are attached and at their outer ends the flights are attached to an endless chain which extends about the tank and is preferably supported in and guided upon a track as shown in detail in Figures 6 and 7. As a further means for centering and guiding the parts and preventing misplacement, a suitable number of tie chains may extend from the hub or the inner ends of the flights to be joined at their outer ends to the chain. The detail of such an attachment of a tie chain to the driving chain is shown in Figure 9.

One suitable means for driving the drive chain is illustrated in Figures 1 and 2 in detail, in which a shaft extends downwardly from a point preferably above the surface of liquid to a point adjacent the bottom of the tank. This shaft carries at its lower end a sprocket with which the driving chain meshes and thus when the shaft is rotated by the motor shown in Figures 1 and 2 or otherwise, the drive chain is rotated and the flights which are attached to it are moved about the tank to collect and convey the settled material toward the sludge hopper from which the sludge is withdrawn.

The construction thus far described, namely, the means for discharging the influent into the tank, and the arrangement of the influent conduit, and the means for sweeping the bottom of the tank and discharging the sludge into the sludge hopper, are all independent of any means for breaking up, collecting or otherwise dealing with scum or any other material on the surface of the liquid. However, it is frequently convenient to associate with the sludge collecting mechanism a scum handling mechanism and in the various forms of the invention shown herewith such a mechanism is illustrated. It is carried on a bridge-like construction which is supported at one end on the wall of the tank and rotates about the tank on a track. At its other end this scum mechanism is mounted on the upper end of the influent conduit and this is true whether that conduit is supported from below by a support 13 or by the influent conduit 95 or whether it is supported from above, upon the suspension system shown in Figures 10 and 11.

When the scum moving mechanism is provided it is arranged to sweep about the tank, to sweep over the entire surface of the tank from its center to its periphery and means are provided for moving it independently of the driving means for the sludge collector. In the form shown herewith this drive comprises a motor on the bridge, driving a pocketed wheel and engaging an endless chain which lies in the overflow trough or elsewhere about the periphery of the tank. As shown this chain passes upwardly over one or more rollers 35 carried in a downwardly projecting support 36 to engage the pocketed wheel 37 and by this means a rotation of the pocketed wheel through the chain drives the bridge and the scum moving assembly about the tank, preferably in a direction of movement opposite to that of the sludge collector.

Scum collecting means are mounted on the bridge, driven preferably from the bridge driving motor and the scum collecting means are caused to move so that they carry scum from the center of the tank toward its periphery. A scum plow fixed on the bridge may be associated with the scum conveyor and any suitable form of scum trough or other means for discharging the collected scum from the tank may be used. No scum trough is illustrated in detail as the present invention is not directed to the construction of a scum trough and in fact might be embodied in a device in which the scum might be removed manually by buckets or otherwise.

When the entire assembly in any of the forms shown herewith is in operation, the bottom of the tank is swept and the sludge which has settled from the liquid is collected toward the center and discharged into the sludge hopper from which it is removed and at the same time the scum or other material on the surface of the tank is collected toward the periphery of the tank and discharged from the tank in any suitable manner.

We claim:

1. In combination in a circular tank, a fixed discharge in its bottom and means for moving material across the bottom to said discharge, said means comprising a track positioned near the periphery of the tank and adjacent its bottom and an endless link chain supported and guided by said track, a plow positioned adjacent the bottom of the tank attached to said chain adjacent its outer end, and a pivot positioned adjacent said discharge and carrying the inner end of said plow, a member on one of said chain links connecting it with the outer end of the plow.

2. In combination in a tank, a fixed discharge in its bottom and means for moving material across the bottom to said discharge, said means comprising a track positioned near the periphery of the tank and adjacent its bottom and an endless link chain supported and guided by said track, a plow positioned adjacent the bottom of the tank attached to said chain adjacent its outer end, and a pivot positioned adjacent said discharge and carrying the inner end of said plow, and an upwardly projecting member located adjacent said discharge and serving as a bearing for said pivot, a member on one of said chain links connecting it with the outer end of the plow.

3. In combination with a tank adapted to contain liquid, influent means, an enclosing wall and a bottom, effluent means about said wall for withdrawing material flowing over the upper edge of said wall, and a central discharge at the bottom of said tank for removing settled material, a scraper positioned in the bottom of said tank and comprising a pair of spirally bent scraping members for scraping the bottom and conveying material so scraped to the central discharge, means for moving said scraper, said means comprising a track positioned about the inside of the tank adjacent its bottom, an endless chain supported by said track, means securing the scraper to said endless chain, said scraper moving means including means for driving said chain, positioned above the normal water level of said tank and a transmission member extending from said driving means to said chain.

4. In combination with a tank adapted to contain liquid, influent means, an enclosing wall and a bottom, effluent means about said wall for withdrawing material flowing over the upper edge of said wall, and a central discharge at the bottom of said tank for removing settled material, a scraper positioned in the bottom of said tank and comprising a pair of spirally bent scraping members for scraping the bottom and conveying material so scraped to the central discharge, means for moving said scraper, said means comprising a track positioned about the inside of the tank adjacent its bottom, an endless chain supported by said track, means securing the scraper to said endless chain, radially positioned guiding chains secured at their outer ends to the endless chain and secured at their inner ends adjacent the inner ends of the scraper, said scraper moving means including means for driving said chain, positioned above the normal water level of said tank and a transmission member extending from said driving means to said chain.

5. In combination with a tank adapted to contain liquid, influent means, an enclosing wall and a bottom, effluent means about said wall for withdrawing material flowing over the upper edge of said wall, and a central discharge at the bottom of said tank for removing settled material, a scraper positioned in the bottom of said tank and comprising a pair of spirally bent scraping members for scraping the bottom and conveying material so scraped to the central discharge, means for moving said scraper, said means comprising a track positioned about the inside of the tank adjacent its bottom, an endless chain supported by said track, means securing the scraper to said endless chain, guiding chains secured at one end generally centrally of said scraper and also at one end to said endless chain, said guiding chains secured intermediate their ends to said scrapers, said scraper moving means including means for driving said chain, positioned above the normal water level of said tank and a transmission member extending from said driving means to said chain.

6. In combination, a sedimentation tank, an effluent weir about the periphery thereof, a fixed column projecting upwardly from the floor thereof, a sludge discharge adjacent the column, an influent pipe extending from the wall of the tank toward the column above the tank floor and below the weir, a scum collector supported at one end on the column and at the other end adjacent the periphery of the tank, means adjacent the periphery of the tank for rotating the scum collector about its support on the column, a sludge collector on the bottom of the tank, means extending downwardly from a point adjacent the periphery of the tank and within the circle described by the outer end of the scum collector for rotating the sludge scraper about the column to convey settled sludge to the sludge discharge.

7. In combination, a sedimentation tank, an effluent weir at the periphery thereof, a sludge discharge at the bottom thereof, a fixed column projecting upwardly from the tank floor adjacent the sludge discharge, an influent pipe extending from the wall of the tank toward the fixed column above the tank floor and below the weir, a scum collector supported at one end on the column and at the other end adjacent the periphery of the tank, means adjacent the periphery of the tank for rotating the scum collector about its support on the column, a sludge collector on the bottom of the tank, means extending downwardly from a point between the center and outer end of the scum collecting mechanism for rotating the sludge scraper about the column to convey settled sludge to the sludge discharge.

8. A sludge collector for settling tanks and the like comprising a curved blade adjacent the floor of a settling tank, means for mounting the blade for rotation about a vertical axis including a track adjacent the tank floor generally concentric with the axis, a continuous drive chain adapted to travel along the outer periphery of the track, a connection between it and the outer end of the blade, a stay chain, extending from a point adjacent the center of rotation of the blade, along a generally radial line, intersecting the blade at a point intermediate its ends and attached at its outer end to the drive chain, and means for moving the chain along the track and a support for the inner end of the blade.

9. A sludge collector for settling tanks and the like comprising a curved blade adjacent the floor of a settling tank, means for mounting the blade for rotation about a vertical axis including a track adjacent the tank floor generally concentric with the axis, a continuous drive chain adapted to travel along the outer periphery of the track, a connection between it and the outer end of the blade, a stay chain, extending from a point adjacent the center of rotation of the blade, along a generally radial line, intersecting the blade at a point intermediate its ends and attached at its outer end to the drive chain, means for moving the chain along the track, and means interposed between the chain and the blade at their intersection to fix their relative positions and a support for the inner end of the blade.

10. A sludge collector for settling tanks and the like comprising a curved blade adjacent the floor of a settling tank, means for mounting the blade for rotation about a vertical axis including a track adjacent the tank floor generally concentric with the axis, a continuous drive chain adapted to travel along the outer periphery of the track, a connection between it and the outer end of the blade, a stay chain, extending from a point adjacent the center of rotation of the blade, along a generally radial line, intersecting the blade at a point intermediate its ends and attached at its outer end to the drive chain, means for moving the chain along the track, and means interposed between the chain and the blade at their intersection to fix their relative positions, said means comprising a wear member on the blade slotted to interlock with the chain and a support for the inner end of the blade.

11. A sludge collector for settling tanks and the like comprising a ring-like frame, a plurality of curved blades projecting outwardly away from the central axis of the ring, a track concentric with the ring, a continuous drive chain adapted to travel along the outer periphery of the track and means for propelling it, connections between the outer ends of the blades and the drive chain, a stay chain extending from the ring in a generally radial direction intersecting the blade and engaging at its outer end, the drive chain, the inner ends of the blades and stay chains being connected to the ring-like frame.

12. A sludge collector for settling tanks and the like comprising a ring-like frame, a plurality of curved blades projecting outwardly away from the central axis of the ring, a track concentric with the ring, a continuous drive chain adapted to travel along the outer periphery of the track and means for propelling it, connections between the outer ends of the blades and the drive chain, a stay chain extending from the ring in a generally radial direction intersecting the blade and engaging at its outer end, the drive chain, and means at the point of intersection of blade and chain for holding them together to fix the relative positions thereof the inner ends of the blades and stay chains being connected to the ring-like frame.

13. In combination, a sedimentation tank, an influent pipe extending inwardly through the wall, above the floor and beneath the water level thereof, a discharge head at the end of the pipe located at a point adjacent the surface of the liquid, a column extending upwardly from the floor and supporting the head, a sludge hopper encircling the column, a passage communicating with the sludge hopper, extending upwardly in the column, a sludge pipe connected to the passage, extending outwardly through the wall of, located above the floor and below the liquid level thereof, a sludge scraper rotatable about the column on the floor of the tank adapted to convey settled sludge toward the sludge hopper, a drive means for the scraper including a power source above the liquid level located adjacent the periphery of the tank, a power transmission member extending downwardly to the scraping means, the scraper wherever it intersects the plane of the two pipes being located entirely beneath them, a skimmer supported at one end upon the periphery of the tank and at the other upon the column, means located adjacent the periphery of the tank above the liquid level further from the column than the sludge conveyor drive means for operating the skimmer.

14. In a sedimentation tank, a central column, a fixed material passage extending from the column to and passing through the wall of the tank above the floor and below the liquid level thereof, sludge conveying means rotatably mounted on the floor of the tank and encircling the column, a skimmer supported above the surface of the liquid on the column and the periphery of the tank, drive means for the sludge scraper including a power source adjacent the periphery of the tank above the liquid level and a power transmission means extending downwardly inside the wall of the tank to the sludge scraper, means for rotating the skimmer about its support on the column, the rotating means being partially above and partially outside of the scraper drive means whereby the skimmer may travel about the tank in a continuous direction without interference with the sludge scraper drive means.

15. In a sedimentation tank having a central sludge hopper, a central influent and a peripheral effluent, a pipe extending inwardly through the wall of the tank above the floor and below the level of the liquid thereof, communicating with and supplying liquid to the influent, a pipe extending through the wall of the tank above the floor and below the level of the liquid, communicating with and adapted to withdraw sludge from the sludge hopper, each of said pipes extending inwardly to the center of the tank, means located at the bottom of the tank and movable therealong for collecting sludge and discharging it into the sludge hopper, means located at the surface of the tank and movable therealong for collecting scum, a power source for each of said collecting means located adjacent the periphery of the tank above the level of the liquid, a connection between one of said power sources and the sludge conveyor located adjacent the periphery of the tank, said power source and said connection being closer to the center of the tank than the power source for the scum conveyor, the scum conveyor and its power source being adapted to pass above and outside of the power source for the sludge conveyor.

WILLIAM W. SAYERS.
FRED E. MIICK.